(12) United States Patent
Carnevali

(10) Patent No.: US 8,821,173 B2
(45) Date of Patent: Sep. 2, 2014

(54) DOCKING STATION HAVING PRELOAD AND CONNECTOR ISOLATOR SYSTEM

(76) Inventor: Jeffrey D. Carnevali, Seattle, WA (US)

( * ) Notice: Subject to any disclaimer, the term of this patent is extended or adjusted under 35 U.S.C. 154(b) by 310 days.

(21) Appl. No.: 13/453,311

(22) Filed: Apr. 23, 2012

(65) Prior Publication Data

US 2012/0206875 A1    Aug. 16, 2012

Related U.S. Application Data

(63) Continuation-in-part of application No. 13/222,997, filed on Aug. 31, 2011, now Pat. No. 8,366,469, which is a continuation-in-part of application No. 12/806,721, filed on Aug. 18, 2010, now Pat. No. 8,366,468.

(51) Int. Cl.
*H01R 13/64* (2006.01)

(52) U.S. Cl.
USPC ........ 439/248; 439/341; 439/928.1; 439/929; 439/384; 361/679.41

(58) Field of Classification Search
USPC ...................... 439/248, 341, 384, 928.1, 929; 361/679.41
See application file for complete search history.

(56) References Cited

U.S. PATENT DOCUMENTS

| | | | | |
|---|---|---|---|---|
| 5,738,537 A * | 4/1998 | Setoguchi et al. | ............ | 439/159 |
| 5,859,762 A * | 1/1999 | Clark et al. | ............. | 361/679.41 |
| 6,135,801 A * | 10/2000 | Helot et al. | ................... | 439/341 |
| 6,527,572 B2 * | 3/2003 | Jou | .............................. | 439/248 |
| 7,544,078 B1 * | 6/2009 | Liu et al. | ........................ | 439/248 |
| 7,606,025 B2 * | 10/2009 | Abram | .......................... | 439/341 |
| 2003/0017746 A1 * | 1/2003 | Lee | .................. | 439/638 |
| 2011/0265290 A1 * | 11/2011 | Carnevali | ........................ | 24/326 |
| 2011/0266230 A1 * | 11/2011 | Carnevali | ........................ | 211/26 |
| 2012/0045931 A1 * | 2/2012 | Carnevali | ..................... | 439/544 |
| 2012/0045932 A1 * | 2/2012 | Carnevali | ..................... | 439/552 |
| 2012/0206875 A1 * | 8/2012 | Carnevali | ................. | 361/679.41 |
| 2014/0034794 A1 * | 2/2014 | Carnevali | .................. | 248/205.3 |

* cited by examiner

*Primary Examiner* — James Harvey
(74) *Attorney, Agent, or Firm* — Charles J. Rupnick Attorney at Law

(57) ABSTRACT

A docking station for a portable computer or other portable computing device. The docking station having a docking tray formed of a tray body formed with a bearing surface that is adapted for receiving thereon a body portion of the portable computing device. A device receiver structure is positioned adjacent to an edge of the bearing surface of the tray body, and a device clamping mechanism is coupled opposite from the receiver structure for cooperating therewith. At least one substantially resilient preload mechanism is positioned adjacent to bearing surface with at least a portion thereof being projected thereabove. A floating expansion connector that is connectable with the device I/O connector is projected from the bearing surface and is resiliently movable in three dimensions relative thereto.

21 Claims, 13 Drawing Sheets

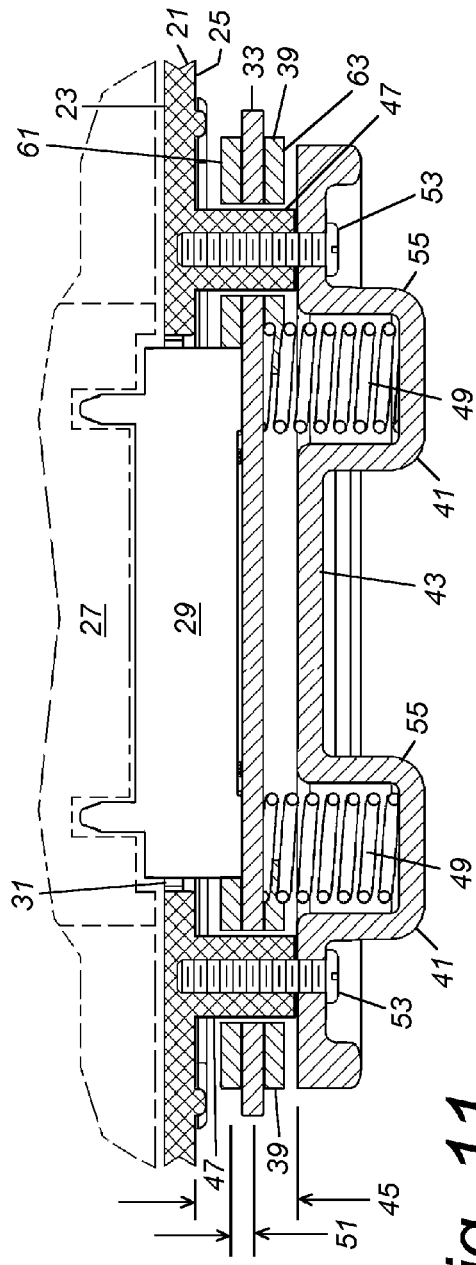
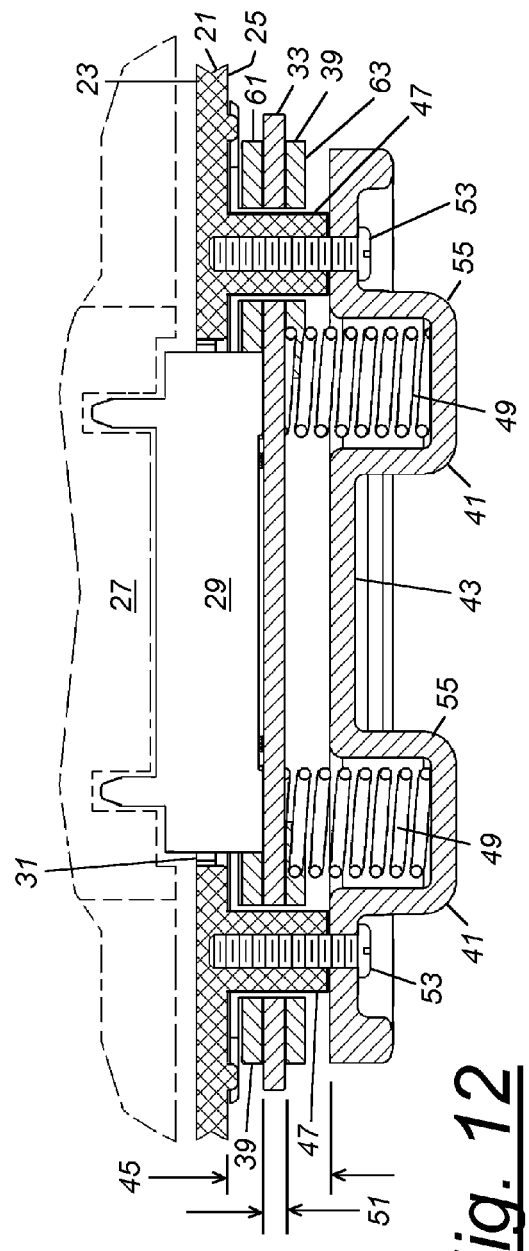

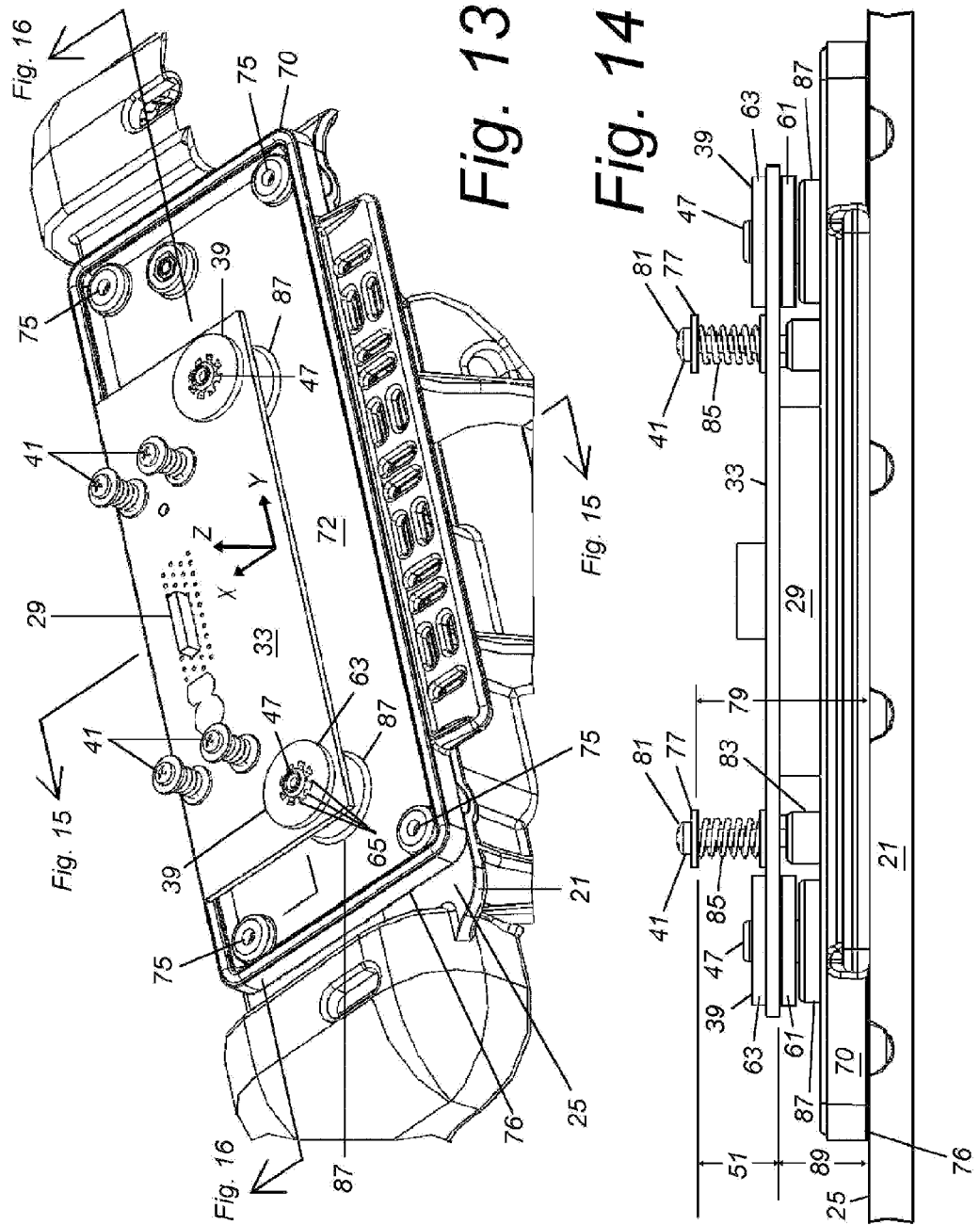

DOCKING STATION HAVING PRELOAD AND CONNECTOR ISOLATOR SYSTEM

This application is a Continuation-in-part and claims priority benefit of copending parent U.S. patent application Ser. No. 13/222,997 filed in the name of Jeffrey D. Carnevali on Aug. 31, 2011 now U.S. Pat. No. 8,366,469, which is a Continuation-in-part and claims priority benefit of copending parent U.S. patent application Ser. No. 12/806,721 filed in the name of Jeffrey D. Carnevali on Aug. 18, 2010 now U.S. Pat. No. 8,366,468, the complete disclosure of which is incorporated herein by reference. This application is related to U.S. patent application Ser. No. 12/799,658 and U.S. patent application Ser. No. 12/799,659, both filed in the name of Jeffrey D. Carnevali on Apr. 28, 2010, the complete disclosures of which are both incorporated herein by reference.

FIELD OF THE INVENTION

The present invention relates generally to docking stations for portable computing devices, and in particular to isolators for retaining secure connection of expansion connectors of active docking stations with input/output (I/O) communication ports of portable computers and other portable computing devices seated in the docking station.

BACKGROUND OF THE INVENTION

Docking stations for portable computers and other portable computing devices are generally well-known, including active docking stations having an expansion connector connectable with an input/output (I/O) communication port of a portable computer and other portable computing device seated therein.

However, known active docking station apparatus are limited in their ability to efficiently provide secure connection between the expansion connector of the docking station apparatus and the I/O communication port of the portable computer or other portable computing device during exposure to shock and vibration environments applied along the direction of insertion of the expansion connector.

SUMMARY OF THE INVENTION

The present invention is a docking station for a portable computer or other portable computing device. The docking station having a docking tray formed of a tray body formed with a bearing surface that is adapted for receiving thereon a body portion of the portable computing device. A device receiver structure is positioned adjacent to an edge of the bearing surface of the tray body, and a device clamping mechanism is coupled opposite from the receiver structure for cooperating therewith. At least one substantially resilient preload mechanism is positioned adjacent to bearing surface with at least a portion thereof being projected thereabove. A floating expansion connector that is connectable with the device I/O connector is projected from the bearing surface and is resiliently movable in three dimensions relative thereto.

For example, the floating expansion connector includes an isolator system having a mounting plate with a contact surface and an opposing operational surface and an aperture extended therebetween; a plurality of backstops spaced a distance away from the operational surface of the mounting plate; a printed circuit board (PCB) or other connector carrier member that is movable out-of-plane between the backstop and the operational surface of the mounting plate, and a plurality of in-plane isolators mounted therein with an electrical connector mounted thereon in a position to pass through the aperture in the mounting plate; and one or more biasing members arranged for urging the connector carrier member toward the mounting plate and the electrical connector through the aperture therein.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 11 and FIG. 12 both illustrate the connector carrier member operated in combination with two of the out-of-plane Z-axis isolators;

FIGS. 13-16 all illustrate a single alternative embodiment of the connector isolator system of the invention, wherein FIG. 13 is a top pictorial view of the alternative embodiment of the connector isolator system, FIG. 14 is a front elevation view of the alternative embodiment of the connector carrier member shown in FIG. 13, FIG. 15 is a side cross-section view thereof, and FIG. 16 is a front cross-section view thereof;

FIGS. 17-25 all illustrate a single additional embodiment of the docking station of the invention including the expansion module of the invention, wherein FIG. 17 is a top pictorial view of the additional embodiment showing a portable computing device seated in the docking tray of the docking;

FIG. 18 illustrates the docking station with the computing device removed for clarity;

FIG. 19 illustrates the docking station with the receiver structure shown in the closed position;

FIG. 20 illustrates the docking station with the receiver structure shown in the open position;

FIG. 21 illustrates the docking station with the receiver structure shown in the open position and a pair of preload levers being pivoted in a position tilted away from the bearing surface of the tray body;

FIGS. 22-25 illustrate installation and removal of portable computing device relative to the docking station, wherein FIG. 22 illustrates the receiver structure being in the open position and one edge of the computing device being seated in the receiver structure in its outwardly tilted position;

FIG. 23 illustrates the receiver structure being in the open position and one edge of the computing device being seated in the receiver structure in its outwardly tilted position;

FIG. 24 illustrates the computing device being partly installed in (or partly removed from) the docking station; and FIG. 25 illustrates the computing device being fully installed in the docking station.

DETAILED DESCRIPTION OF PREFERRED EMBODIMENT

As required, a detailed illustrative embodiment of the present connector isolator is disclosed herein. However, techniques, systems and operating structures in accordance with the present connector isolator may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present connector isolator. The following presents a detailed description of an illustrative embodiment (as well as some alternative embodiments) of the present connector isolator.

In the Figures, like numerals indicate like elements.

Figure 1:
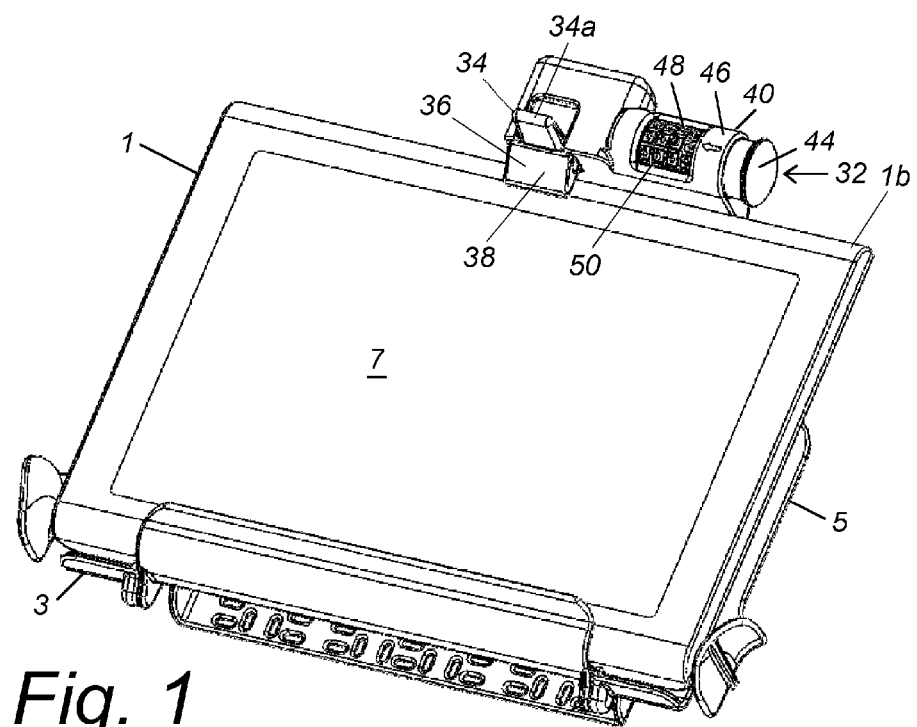
FIG. 1 shows a portable computer or other portable computing device seated in a docking tray of a docking station.

FIG. 1 shows a portable computer or other portable computing device 1 seated in a docking tray 3 of a docking station 5. Such portable computing devices 1 are generally provided with one or more connectors and ports for function expansion, usually on the rear face of its casing which supports its display unit 7. These portable computing devices 1 are furnished with additional functions by connecting peripheral devices, such as a hard disk drive, mouse, printer, etc., to the connectors and ports.

Docking tray 3 optionally includes a security mechanism 32, for example but not limited to a variable level security mechanism of the type disclosed in U.S. patent application Ser. Nos. 12/799,658 and 12/799,659, both filed by the inventor of the instant invention and incorporated herein by reference. Variable level security mechanism 32 is structured for securably retaining portable computing device 1 in docking tray 3 of docking station 5. Variable level security mechanism 32 includes a variably securable latching element 34 for securably retaining portable computing device 1 in docking tray 3. When device 1 is seated in docking tray 3, latching element 34 is movable between a latched position relative to docking tray 3 for retaining therein device 1, and an unlatched position for permitting removal of device 1 from docking tray 3. Here, latching element 34 is illustrated in the latched position, wherein a tongue member 36 is in an extended configuration for retaining device 1 in docking tray 3. Tongue member 36 optionally includes a sloping or inclined lead-in surface 38, similar to a common door latch, for pushing tongue member 36 outwardly toward a retracted configuration away from secure engagement with device 1 to permit an upper portion 1b to pass. When device 1 is seated relative to docking tray 3, tongue member 36 is moved back into an extended configuration substantially encompassing a portion of upper portion 1b of device 1, as shown. A latch handle 34a may be provided for disengaging latching element 34.

Variable level security mechanism 32 includes a plunger-type security mechanism 40 for fixing tongue member 36 of latching element 34 either extended in the latched configuration for retaining device 1 in docking tray 3, or retracted in the unlatched configuration for permitting subsequent removal of device 1.

As disclosed in U.S. patent application Ser. Nos. 12/799,658 and 12/799,659 by example and without limitation, plunger-type security mechanism 40 including a plunger element that is movable between extended and retracted configurations for interacting with tongue member 36 for fixing it in either of the extended and retracted configurations. For example, security mechanism 40 includes a handle 44 coupled to the plunger element for manually pulling and pushing the plunger element between the extended and retracted configurations relative to a body portion 46. Variable level security mechanism 32 also includes a lock element 48 operable for locking security mechanism 40 against tampering. Lock element 48 requires application of a combination or other key mechanism for releasing security mechanism 40 in order to unfix the plunger element relative to body portion 46 for movement between the extended and retracted configurations. By example and without limitation, lock element 48 is embodied as a combination device having a plurality of rotating dials 50 each being inscribed with a plurality of alpha-numeric symbols that must be aligned in a prearranged sequence for release. As is generally well understood, rotating dials 50 interact with several discs or cams which directly interact with the locking mechanism. Alternatively, the prearranged sequence is entered through an electronic or mechanical keypad. Once lock element 48 is released, the plunger element is unfixed relative to body portion 46 and can be moved by pushing or pulling handle 44 relative to body portion 46.

Security mechanism 40 is adapted for being joined to latching element 34 in a manner that permits the plunger element to interact therewith for fixing tongue member 36 in either of the extended and retracted configurations. For example, as disclosed in U.S. patent application Ser. Nos. 12/799,658 and 12/799,659 by example and without limitation, body portion 46 of plunger-type security mechanism 40 includes a threaded connector opposite from handle 44 surrounding the plunger element. The threaded connector is adapted for threadedly joining security mechanism 40 to latching element 34.

Figure 2:
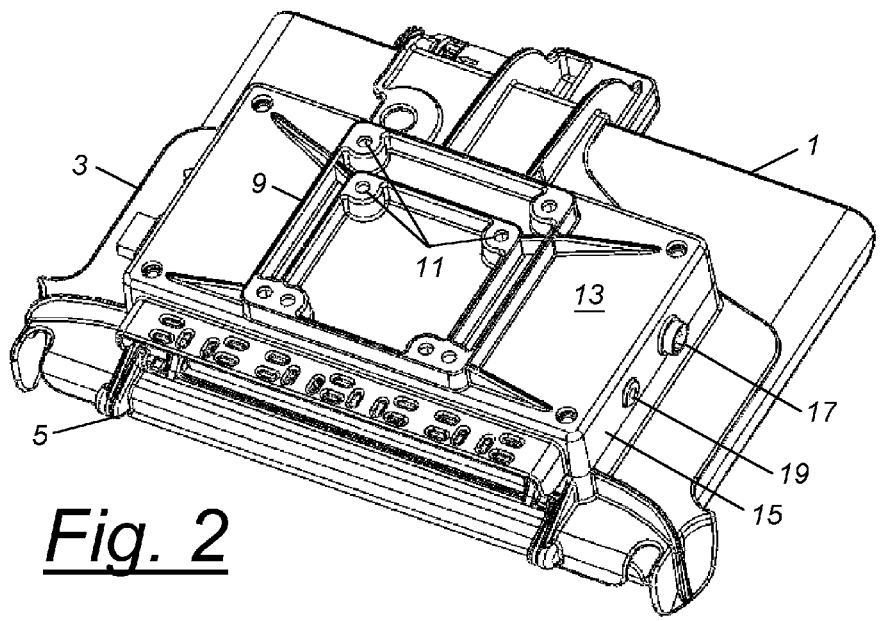
FIG. 2 shows a backside of the docking tray which includes an expansion module.

FIG. 2 shows the backside of docking tray 3 which includes a mounting structure 9 that is structured to adapt docking station 5 for mounting to an external support structure, by example and without limitation, a universally positionable device invented by the inventor of the present invention as disclosed in U.S. Pat. No. 5,845,885, which is incorporated herein by reference. By example and without limitation, mounting structure 9 is provided as a plurality of mounting holes 11 projected from a bottom plane 13. Other mounting structures 9 are also contemplated and may be substituted without departing from the spirit and scope of the invention.

Docking station 5 includes an expansion module 15, for example, integrated with mounting structure 9. Expansion module 15 includes, for example, a power adaptor port 17 for connecting an external power supply and a data input/output (I/O) port 19 such as a Universal Serial Bus (USB) port or other data transfer port.

Figure 3:
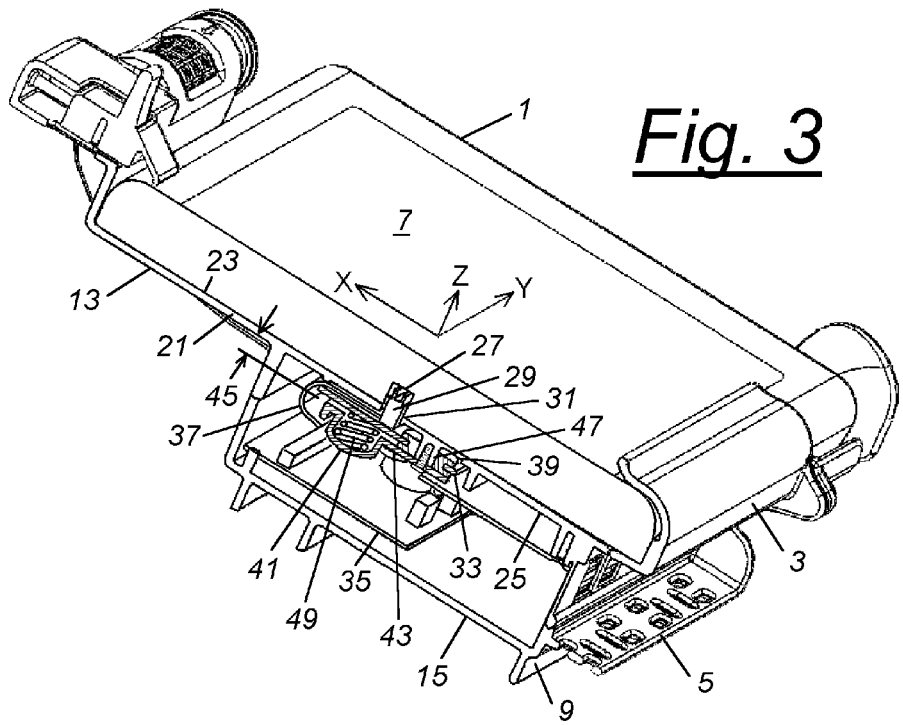
FIG. 3 and FIG. 4 are different views of the docking station of FIGS. 1 and 2, each showing a cross-sections of the expansion module.
Figure 4:
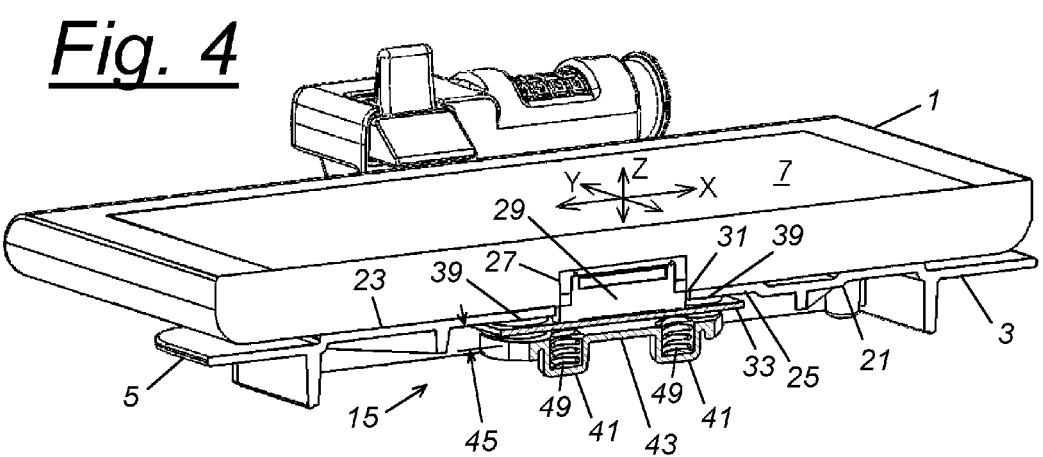

FIG. 3 and FIG. 4 are different cross-section views of docking station 5 wherein docking tray 3 is formed with a device bearing plate 21 having an external bearing surface 23 where portable computing device 1 is seated, and an opposite interface surface 25 where expansion module 15 is mounted. Portable computing device 1 includes an expansion connector port 27 for function expansion. Expansion connector port 27 is structured to receive an electrical expansion connector 29 that is provided at bearing surface 23. For example, electrical expansion connector 29 is projected through an aperture 31 formed through bearing plate 21 between its external bearing surface 23 and opposing interface surface 25. Aperture 31 is sized to permit expansion connector 29 to move laterally in the plane of bearing plate 21 to reposition sufficiently to mate with expansion connector port 27 when portable computing device 1 is seated in docking tray 3.

Expansion connector 29 is fixedly mounted on a rigid connector carrier member 33 such as a printed circuit board (connector carrier PCB). Expansion module 15 may also include an expansion printed circuit board 35 (expansion PCB) in electrical communication with connector carrier member 33, or in direct communication with expansion connector 29, for example, through a flexible ribbon cable 37 extended therebetween.

Expansion module 15 includes a connector isolator system having both one or more in-plane isolators 39 that isolate against lateral motion in the X-Y plane of connector carrier member 33, and one or more out-of-plane Z-axis isolators 41 that isolate against out-of-plane motion along the Z-axis perpendicular to the X-Y plane, i.e., along the direction of insertion of expansion connector 29 into expansion connector port 27 of computing device 1. In-plane isolators 39 permit lateral motion in the X-Y plane of connector carrier member 33 within a limited range for mating expansion connector 29 with expansion connector port 27 of portable computing device 1. However, in-plane isolators 39 permit expansion connector 29 to remain in constant electrical connection with expansion connector port 27 only during application of lateral shock and vibration loads in the X-Y plane that cause responsive in-plane motion of computing device 1 within docking tray 3 such that communication is uninterrupted between computing device 1 and expansion PCB 35.

Unfortunately, in-plane isolators 39 only respond to lateral X-Y in-plane motion of connector carrier member 33 and expansion connector 29 fixedly mounted thereon. X-Y in-plane isolators 39 cannot respond to out-of-plane Z-axis motion of computing device 1 within docking tray 3. Rather, shock or vibration inputs that cause out-of-plane separation of computing device 1 from docking tray 3, even within a limited range, can also cause momentary separation of expansion connector 29 from expansion connector port 27 of portable computing device 1. Therefore, one or more out-of-plane Z-axis isolators 41 couple connector carrier member 33, which supports expansion connector 29, to bearing plate 21 of docking tray 3. By example and without limitation, out-of-plane Z-axis isolators 41 include a rigid backstop 43 that is spaced a fixed offset distance 45 away from an interface surface by a spacer 47. Connector carrier member 33, having one or more in-plane isolators 39, is movably positioned between backstop 43 and interface surface 25 of bearing plate 21 so as to be movable out-of-plane, i.e., along the Z-axis. One or more biasing members 49, by example and without limitation coil compression springs (shown), resiliently urge connector carrier member 33 out-of-plane along the Z-axis toward bearing plate 21 of docking tray 3, whereby expansion connector 29 is positively urged toward computing device 1 and into constant engagement with expansion connector port 27, even when shock or vibration inputs cause out-of-plane separation of computing device 1 from bearing plate 21 of docking tray 3.

Figure 5:
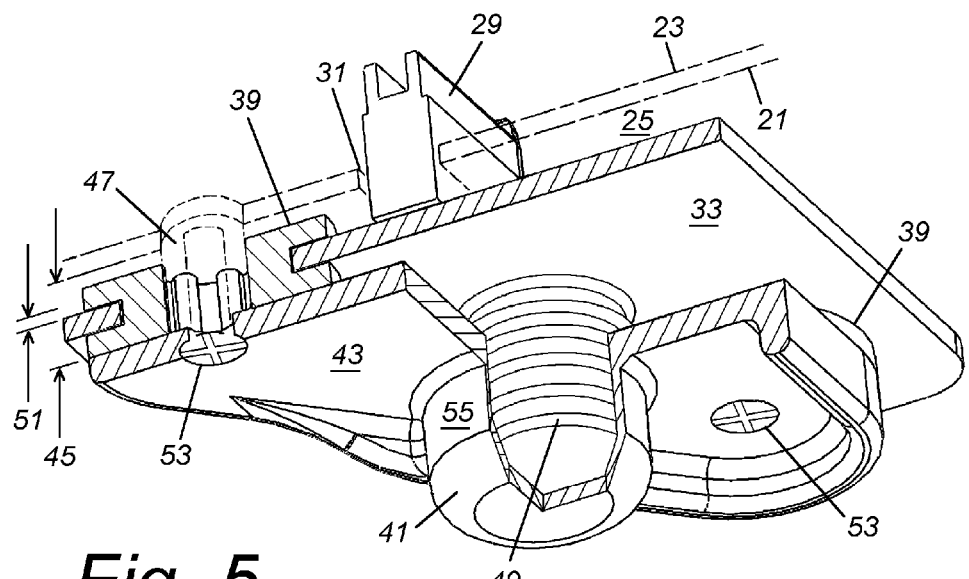
FIG. 5 and FIG. 6 show details of an out-of-plane Z-axis isolator of the invention.

FIG. 5 shows details of out-of-plane Z-axis isolators 41 wherein connector carrier member 33 is displaced along Z-axis away from interface surface 25 of bearing plate 21 (shown in phantom) toward backstop 43, as when portable computing device 1 is flush against bearing surface 23 of bearing plate 21. For example, connector carrier member 33 is movable within a constant engagement range 51 between backstop 43 and interface surface 25 of bearing plate 21. Constant engagement range 51 is sized to ensure constant engagement of electrical connector 29 with expansion connector port 27 of portable computing device 1 during out-of-plane Z-axis motion of computing device 1 within docking tray 3 due to normal shock or vibration inputs that cause out-of-plane separation of computing device 1 from docking tray 3. For example, constant engagement range 51 is, but not limited to, about 0.060 inch for the present application, wherein shock and vibration regimens result in out-of-plane separation of about 0.040 inch of computing device 1 from docking tray 3, whereby out-of-plane separation cannot exceed constant engagement range 51 of out-of-plane Z-axis isolators 41. According to one embodiment, connector carrier member 33 is coupled to bearing plate 21 of docking tray 3 by threaded fasteners or other retainers 53 joined to bearing plate 21 through spacers 47, and constant engagement range 51 is set by the length of spacers 47. When portable computing device 1 is seated on external bearing surface 23 of docking tray 3 with expansion connector port 27 mated with expansion connector 29 through aperture 31, biasing members 49 are compressed along Z-axis into respective sockets or other receivers 55 formed in backstop 43. Simultaneously, in-plane isolators 39 slide along length of respective spacers 47 for at least a portion of constant engagement range 51 or until bottoming out against backstop 43, and connector carrier member 33 is forced against expansion of biasing members 49 away from interface surface 25 of bearing plate 21.

Figure 6:
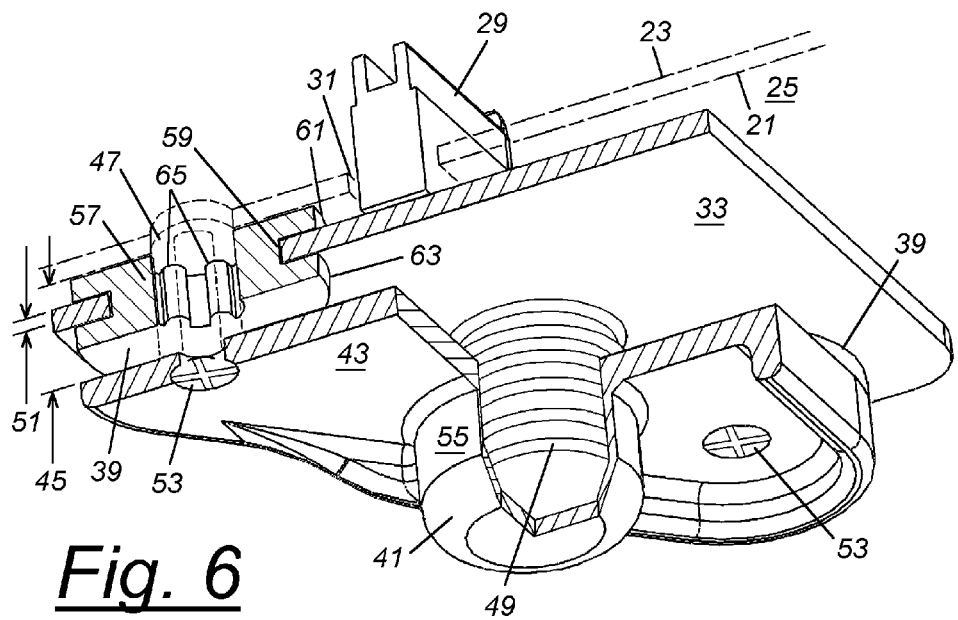

FIG. 6 shows details of out-of-plane Z-axis isolators 41 wherein connector carrier member 33 is displaced along Z-axis away from backstop 43 toward interface surface 25 bearing plate 21 (shown in phantom), as when shock or vibration inputs cause out-of-plane separation of computing device 1 away from bearing surface 23 of bearing plate 21. Here, biasing members 49 are expanded along Z-axis between backstop 43 and interface surface 25 of bearing plate 21. Simultaneously, in-plane isolators 39 slide along length of respective spacers 47 for at least a portion of constant engagement range 51 or until bottoming out against interface surface 25 of bearing plate 21, and connector carrier member 33 is forced by expansion of biasing members 49 away from backstop 43 and toward interface surface 25 of bearing plate 21. Accordingly, expansion connector 29 is projected through aperture 31 to remain in mated connection with expansion connector port 27 of computing device 1.

Here, in-plane isolators 39 are elastomeric bushings having a central tube 57 fit through an aperture 59 through connector carrier member 33, and upper and lower flanges or lips 61, 63 positioned on opposites of connector carrier member 33. A plurality of elastomeric isolation spokes 65 are projected radially inwardly of central tube 57. Spacers 47 are slidingly received through isolator tube 57 between isolation spokes 65. During initial seating of computing device 1, isolation spokes 65 bend radially under lateral X-Y in-plane pressure of spacers 47 to lateral X-Y in-plane motion of connector carrier member 33 to accommodate mating of expansion connector 29 with expansion connector port 27 of portable computing device 1. When docking station 5 is subjected to lateral shock and vibration loads in the X-Y plane, isolation spokes 65 bend radially to permit limited lateral X-Y in-plane motion of connector carrier member 33 to maintain constant lateral engagement of expansion connector 29 with expansion connector port 27. However, as disclosed herein, X-Y in-plane isolators 39 cannot respond to out-of-plane Z-axis motion of computing device 1 within docking tray 3, such that shock and/or vibration inputs having an out-of-plane Z-axis component potentially interrupt communication between expansion PCB 35 and computing device 1.

Figure 7:
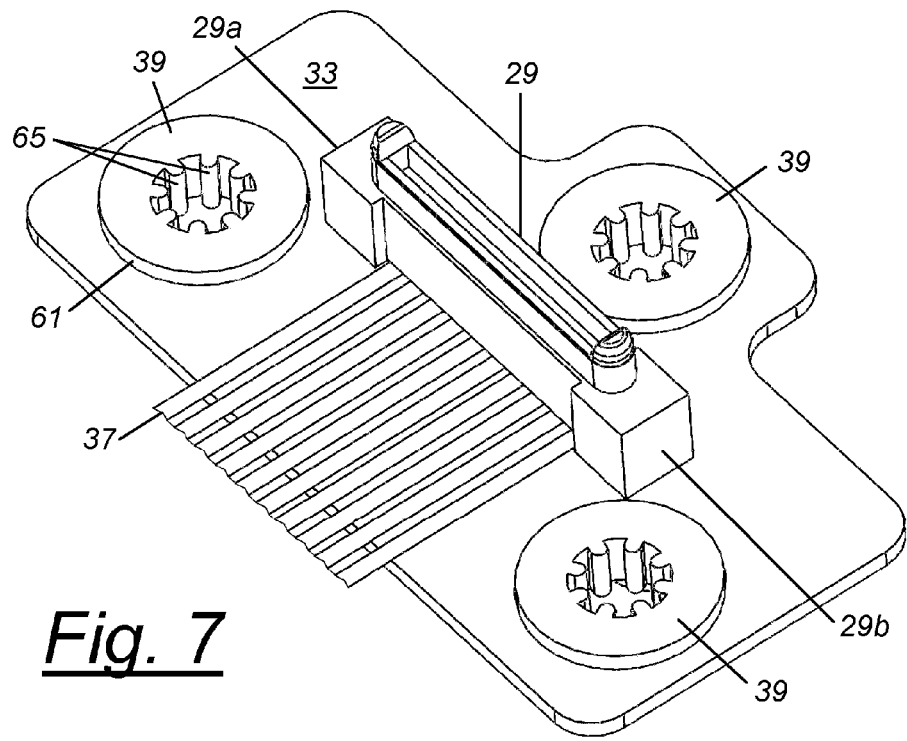
FIG. 7 shows an expansion connector mounted on a PCB or other connector carrier member with three in-plane isolators.

FIG. 7 shows expansion connector 29 mounted on connector carrier member 33 with in-plane isolators 39.

Figure 8:
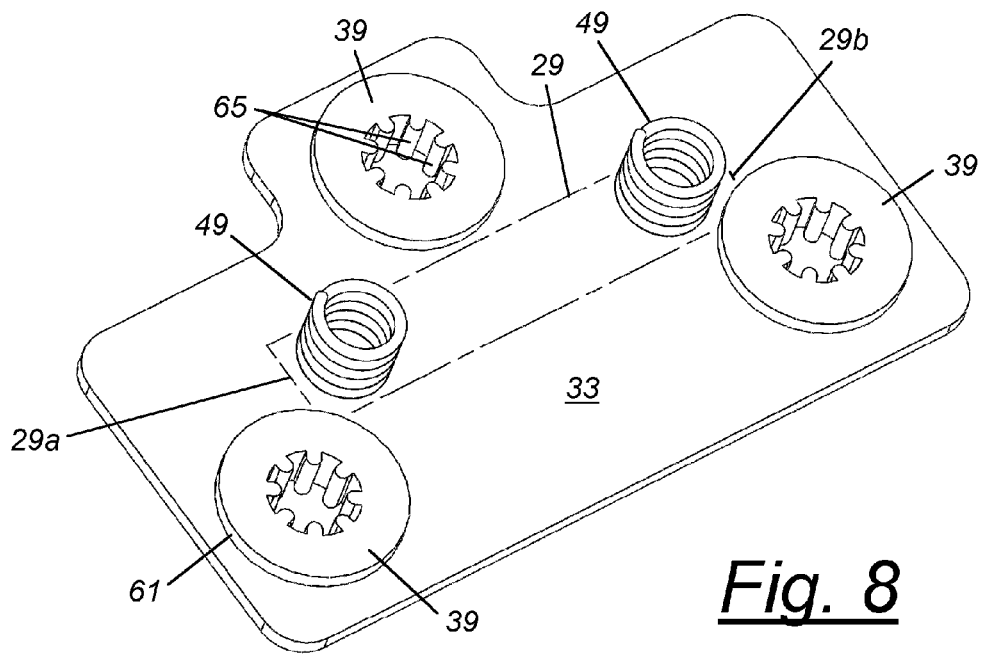
FIG. 8 shows an opposite side of the connector carrier member from FIG. 7.

FIG. 8 shows connector carrier member 33 opposite from expansion connector 29 and having in-plane isolators 39 with footprint of expansion connector 29 (shown in phantom). Biasing members 49 of two or more out-of-plane Z-axis isolators 41 are positioned on connector carrier 33 between a triangular plurality of X-Y in-plane lateral shock and vibration isolators 39. For example, as shown here, biasing members 49 are positioned opposite from expansion connector 29, and substantially aligned with end portions 29a, 29b thereof (shown in FIG. 7).

Figure 9:
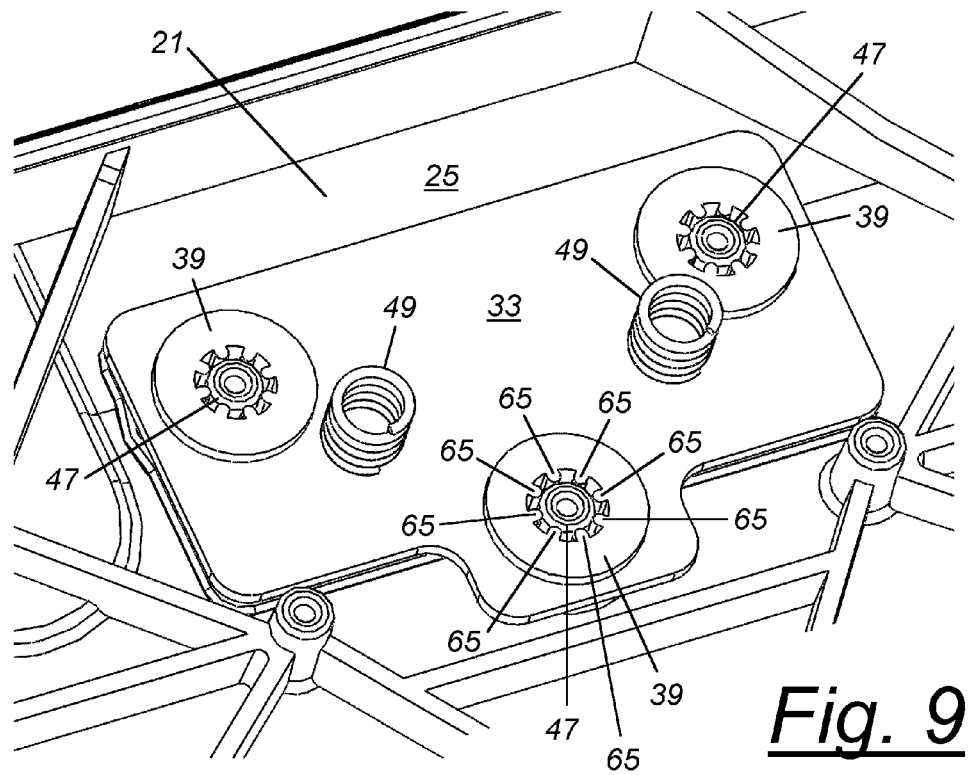
FIG. 9 illustrates the connector carrier positioned on a bearing plate of the docking tray.

FIG. 9 illustrates connector carrier member 33 positioned on bearing plate 21 of docking tray 3 with X-Y in-plane lateral shock and vibration isolators 39 slidingly installed over a triangular arrangement of spacers 47 projected from interface surface 25 of bearing plate 21. Connector carrier member 33 is thus slidingly suspended between backstop 43 and interface surface 25 of bearing plate 21. Accordingly, connector carrier member 33 is slidably movable out-of-plane, i.e., along the Z-axis, by lateral shock and vibration isolators 39 sliding along respective spacers 47. Backstop 43 is shown removed here to show biasing members 49.

Figure 10:
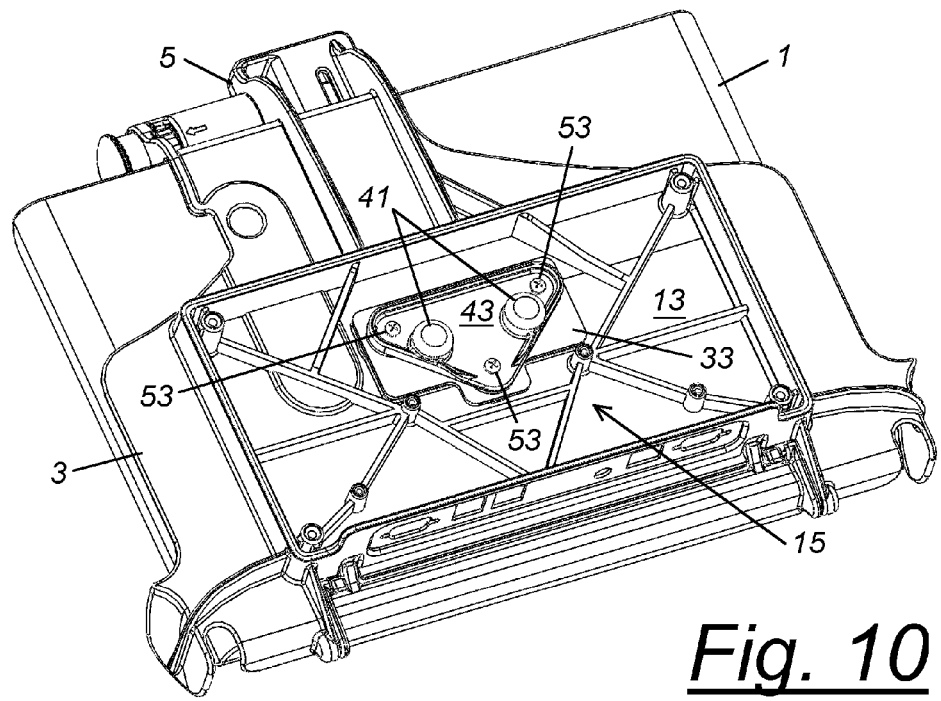
FIG. 10 illustrates the connector carrier member sandwiched between an interface surface of the bearing plate and a rigid backstop.

FIG. 10 illustrates connector carrier member 33 sandwiched between interface surface 25 of bearing plate 21 and backstop 43. As disclosed herein, biasing members 49 are captured between connector carrier member 33 and backstop 43 for resiliently urging connector carrier member 33 out-of-plane along the Z-axis toward bearing plate 21 of docking tray 3.

FIG. 11 and FIG. 12 both illustrate connector carrier member 33 operated in combination with out-of-plane Z-axis isolators 41. In both FIG. 11 and FIG. 12, portable computing device 1 is positioned on bearing plate 21 of docking tray 3. Furthermore, expansion connector 29 is constantly mated with expansion connector port 27 of portable computing device 1.

In FIG. 11, portable computing device 1 is seated substantially flush against external bearing surface 23 of bearing plate 21. Accordingly, expansion connector port 27 of computing device 1 is positioned adjacent to aperture 31 in bearing plate 21. Connector carrier member 33 is displaced away from bearing plate 21 and toward spaced-away backstop 43 by mating of expansion connector 29 with expansion connector port 27 of portable computing device 1. When computing device 1 is seated substantially flush against external bearing surface 23 of bearing plate 21, displacement of connector carrier member 33 toward backstop 43 compresses biasing members 49 into sockets 55 or otherwise against backstop 43, while retainers 53 fix backstop 43 against spacers 47 of out-of-plane Z-axis isolators 41 at fixed offset distance 45 from bearing plate 21. Connector carrier member 33 is thus under constant pressure of compressed biasing members 49 to push expansion connector 29 into mating contact with expansion connector port 27 of portable computing device 1.

In FIG. 12, portable computing device 1 is lifted away from external bearing surface 23 of bearing plate 21, as by application of shock and/or vibration inputs having an out-of-plane Z-axis component. In response to portable computing device 1 being lifted away from external bearing surface 23 of bearing plate 21, out-of-plane Z-axis isolators 41 automatically operate to responsively urge expansion connector 29 into mating contact with expansion connector port 27 of portable computing device 1.

Here, compressed biasing members 49 automatically operate between bearing plate 21 and backstop 43 by expanding to displace connector carrier member 33 along spacers 47 toward interface surface 25 of bearing plate 21. Expanding biasing members 49 in turn pushes expansion connector 29 into maintaining constant mating contact with expansion connector port 27 of portable computing device 1. Therefore, out-of-plane Z-axis isolators 41 automatically maintain expansion connector 29 in maintaining constant mating contact with expansion connector port 27 of portable computing device 1 within constant engagement range 51 of connector carrier member 33, as disclosed herein.

Alternative Embodiment

Figure 15:
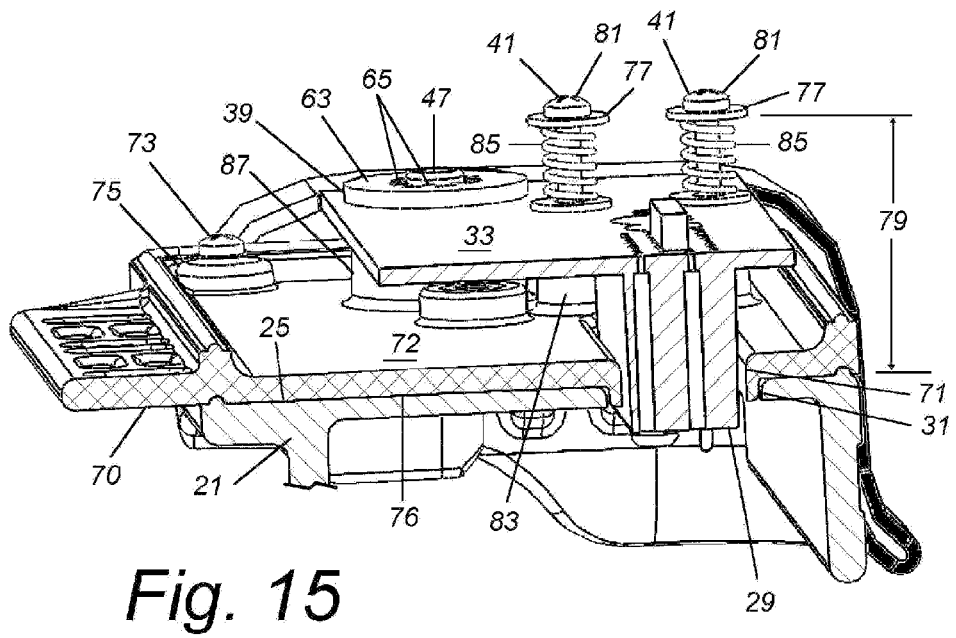
Figure 16:
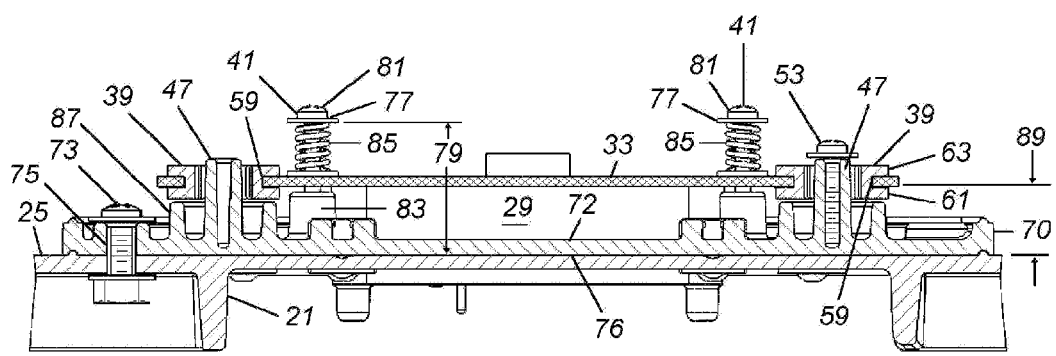

FIGS. 13-16 all illustrate a single alternative embodiment of the connector isolator system of the invention, wherein FIG. 13 is a top pictorial view of the alternative embodiment of the connector isolator system, FIG. 14 is a front elevation view of the alternative embodiment of the connector carrier member shown in FIG. 13, FIG. 15 is a side cross-section view thereof, and FIG. 16 is a front cross-section view thereof.

According to this alternative embodiment of the connector isolator system of the invention, expansion connector 29 is fixedly mounted on rigid connector carrier member 33 such as a printed circuit board (connector carrier PCB). Expansion module 15 may also include expansion printed circuit board 35 (expansion PCB) in electrical communication with connector carrier member 33, shown for example in FIG. 3. Connector carrier member 33 is moveably coupled to a mounting plate 70 with expansion connector 29 projected through an aperture 71 (shown in FIG. 15) formed through mounting plate 70 between its external contact surface 76 and opposing operational surface 72. For example, one or more in-plane X-Y isolators 39 and one or more out-of-plane Z-axis isolators 41 combine to suspend connector carrier member 33 above an operational surface 72 of mounting plate 70. In operation, expansion connector 29 is insert into expansion connector port 27 of computing device 1, as disclosed herein. Thereafter, mounting plate 70 is attached to interface surface 25 of device bearing plate 21 opposite of external bearing surface 23 where portable computing device 1 is seated, shown for example in FIGS. 3 and 4. For example, fasteners 73 are mounted through a plurality of apertures 75 for coupling a contact surface 76 of mounting plate 70 to interface surface 25 of device bearing plate 21, as shown for example in FIG. 16.

Here, the connector isolator system includes one or more in-plane X-Y isolators 39 that isolate against lateral motion in the X-Y plane of connector carrier member 33, and one or more out-of-plane Z-axis isolators 41 that isolate against out-of-plane motion along the Z-axis perpendicular to the X-Y plane, i.e., along the direction of insertion of expansion connector 29 into expansion connector port 27 of computing device 1. Here, also in-plane isolators 39 permit lateral motion in the X-Y plane of connector carrier member 33 within a limited range for mating expansion connector 29 with expansion connector port 27 of portable computing device 1. However, in-plane isolators 39 permit expansion connector 29 to remain in constant electrical connection with expansion connector port 27 only during application of lateral shock and vibration loads in the X-Y plane that cause responsive in-plane motion of computing device 1 within docking tray 3 such that uninterrupted communication is maintained between computing device 1 and expansion PCB 35.

As disclosed herein, in-plane isolators 39 unfortunately only respond to lateral X-Y in-plane motion of connector carrier member 33 and expansion connector 29 fixedly mounted thereon. X-Y in-plane isolators 39 cannot respond to out-of-plane Z-axis motion of computing device 1 within docking tray 3. Rather, shock or vibration inputs that cause out-of-plane separation of computing device 1 from docking tray 3, even within a limited range, can also cause momentary separation of expansion connector 29 from expansion connector port 27 of portable computing device 1. Therefore, one or more out-of-plane Z-axis isolators 41 couple connector carrier member 33, which supports expansion connector 29, to bearing plate 21 of docking tray 3. By example and without limitation, out-of-plane Z-axis isolators 41 each include a rigid backstop 77 that is spaced a maximum offset distance 79 away from contact surface 76 of mounting plate 70, and in operation interface surface 25 of device bearing plate 21, by a spacer post 81. For example, spacer posts 81 is a shoulder screw threaded into a boss 83 formed on operational surface 72 of mounting plate 70, whereby maximum offset distance 79 spacing of backstop 77 away from contact surface 76 is adjustable by threading screw-type spacer posts 81 into or out of boss 83. Connector carrier member 33 is movably positioned by one or more in-plane isolators 39 between backstop 77 and operational surface 72 of mounting plate 70 so as to be movable out-of-plane, i.e., along the Z-axis. One or more biasing members 85, by example and without limitation coil compression springs (shown), is positioned between connector carrier member 33 and backstops 77 for resiliently urge connector carrier member 33 out-of-plane along the Z-axis toward bearing plate 21 of docking tray 3, whereby expansion connector 29 is positively urged toward computing device 1 and into constant engagement with expansion connector port 27, even when shock or vibration inputs cause out-of-plane separation of computing device 1 from bearing plate 21 of docking tray 3.

FIG. 13 shows a plurality of out-of-plane Z-axis isolators 41 positioned surrounding and balancing expansion connector 29. For example, four out-of-plane Z-axis isolators 41 are illustrated at the four corners of expansion connector 29. Alternatively, three out-of-plane Z-axis isolators 41 are positioned in a triangular pattern balancing expansion connector 29.

FIG. 13 also shows two of in-plane isolators 39 positioned adjacent to opposite ends of expansion connector 29. Alternatively, three X-Y in-plane lateral shock and vibration isolators 39 are positioned in a triangular arrangement around expansion connector 29, as disclosed in FIG. 8.

Spacer hubs 87 around the base of in-plane isolators 39 support connector carrier member 33 a fixed minimum offset distance 89 away from contact surface 76 of mounting plate 70.

In-plane isolators 39 are each slidably supported on spacers 47 which, by example and without limitation, are configured as guide posts that are extended from the center of one of spacer hubs 87. However, this arrangement of guide posts 47 with spacer hubs 87 is only for convenience of manufacture and is not critical to the practice of the invention.

As disclosed herein, in-plane isolators 39 are elastomeric bushings having a central tube 57 fit through an aperture 59 through connector carrier member 33, and upper and lower flanges or lips 61, 63 positioned on opposites of connector carrier member 33. A plurality of elastomeric isolation spokes 65 are projected radially inwardly of central tube 57. Guide posts 47 are slidingly received through isolator tube 57 between isolation spokes 65. During initial seating of computing device 1, isolation spokes 65 bend radially under lateral X-Y in-plane pressure of guide posts 47 to lateral X-Y in-plane motion of connector carrier member 33 to accommodate mating of expansion connector 29 with expansion connector port 27 of portable computing device 1. When docking station 5 is subjected to lateral shock and vibration loads in the X-Y plane, isolation spokes 65 bend radially against guide posts 47 to permit limited lateral X-Y in-plane motion of connector carrier member 33 for maintaining constant lateral engagement of expansion connector 29 with expansion connector port 27.

As disclosed herein, connector carrier member 33 is coupled to mounting plate 70 by guide posts 47, and is movable within constant engagement range 51 is the distance between maximum and minimum offset distances 79, 89 relative to contact surface 76 of mounting plate 70 as set by rigid backstops 77 and spacer hubs 87, respectively. When portable computing device 1 is seated on external bearing surface 23 of docking tray 3 with expansion connector port 27 mated with expansion connector 29 through aperture 31, biasing members 85 are compressed along Z-axis about respective spacer posts 81 extended from operational surface 72 of mounting plate 70. Simultaneously, in-plane isolators 39 slide along length of respective guide posts 47 for at least a portion of constant engagement range 51 or until bottoming out against backstops 77, and connector carrier member 33 is forced against expansion of biasing members 85 away from contact surface 76 of mounting plate 70 and interface surface 25 of bearing plate 21.

Optionally, constant engagement range 51 is adjustable by adjusting maximum offset distance 79 spacing of backstop 77 away from contact surface 76, as disclosed herein.

As illustrated in FIG. 16 (right side) connector carrier member 33 is optionally coupled to bearing plate 21 of docking tray 3 by threaded fasteners or other retainers 53 joined to mounting plate 70 through guide posts 47, and constant engagement range 51 is set by the length of guide posts 47. However, retainers 53 are optional and are not critical to the practice of the invention at least because coil spring biasing members 85 react against backstops 77 to urge connector carrier member 33 out-of-plane along the Z-axis toward operational surface 72 of mounting plate 70. Furthermore, reaction of biasing member 85 against backstops 77 effectively prevents overtravel of in-plane isolators 39 along guide posts 47 and disengagement of in-plane isolators 39 from guide posts 47. Additionally, the length of guide posts 47 can be adjusted to cooperate with a given biasing member 85 in combination with a given offset distance 79 of rigid backstop 77 away from contact surface 76 of mounting plate 70 to insure continuous engagement of in-plane isolators 39 with guide posts 47. Also, when spacer posts 81 is a shoulder screw threaded into a boss 83 formed on operational surface 72 of mounting plate 70, offset distance 79 of rigid backstop 77 away from contact surface 76 of mounting plate 70 is adjustable by advancing shoulder screw-type spacer posts 81 into engagement with mounting plate 70 thereby decreasing offset distance 79 or, in the alternative, backing shoulder screw-type spacer posts 81 away from engagement with mounting plate 70 thereby increasing offset distance 79.

Additional Embodiment

Figure 17:
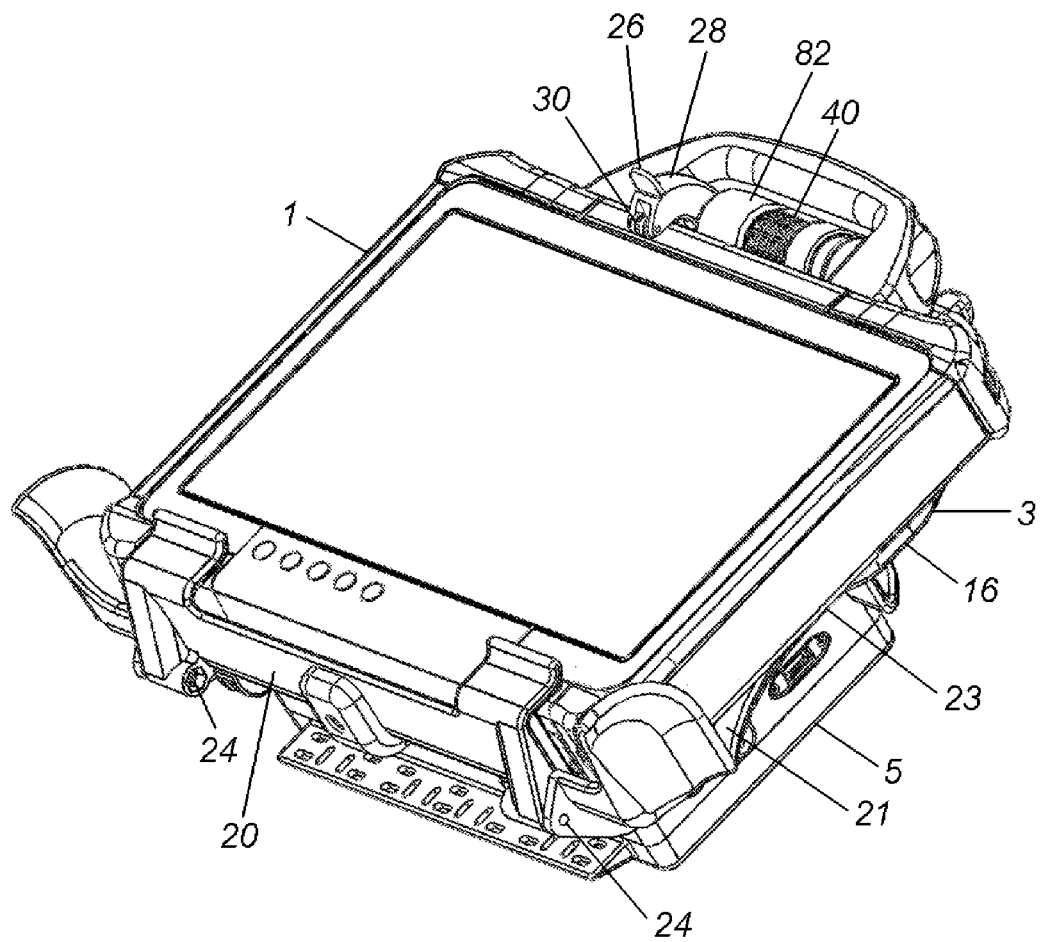

FIGS. 17-25 all illustrate a single additional embodiment of the docking station 5 of the invention including expansion module 15 of the invention, wherein FIG. 17 is a top pictorial view of the additional embodiment showing portable computing device 1 seated in docking tray 3 of docking station 5.

FIG. 17 illustrates a docking station 5 of the present invention having docking tray 3 structured to receive thereinto an computing device 1, such as a portable laptop computer, or other portable computing device intended to be operated with a docking station. Docking tray 3 includes a tray body 16 having bearing plate 21 formed with external bearing surface 23 on which computing device 1 is to be placed, and a receiver structure 20 positioned adjacent to an edge 22 of bearing surface 23, as more clearly illustrated in FIG. 18. Receiver structure 20 is pivotable relative to bearing surface 23, for example by means of one or more pivot pins 24 coupled between receiver structure 20 and tray body 16.

A clamping mechanism 26 is coupled to tray body 16 substantially opposite from receiver structure 20 and is adapted for cooperating therewith for securing device 1 relative to tray body 16 and bearing surface 23 thereof. Clamping mechanism 26, for example, is formed of a clamping arm 28 that is pivotally coupled to tray body 16, as illustrated more clearly in FIG. 18, and has a roller 30 rotatably secured adjacent to one end thereof distal of tray body 16 for motion between an unsecured position (FIG. 24) rotated away from receiver structure 20 for releasing computing device 1, and a secure position (FIG. 25) rotated toward receiver structure 20 for securing device 1 in docking tray 3. Security mechanism 82 is secured by combination lock such as plunger-type security mechanism 40, or else a key lock. Security mechanism 82 is operable for locking clamping mechanism 26 in either or both of the secure and unsecured positions. Security mechanism 82 is optionally lockable in a non-securing relationship with clamping mechanism 26 wherein clamping mechanism 26 cannot be locked and remains movable between the secure and unsecured positions.

Figure 18:
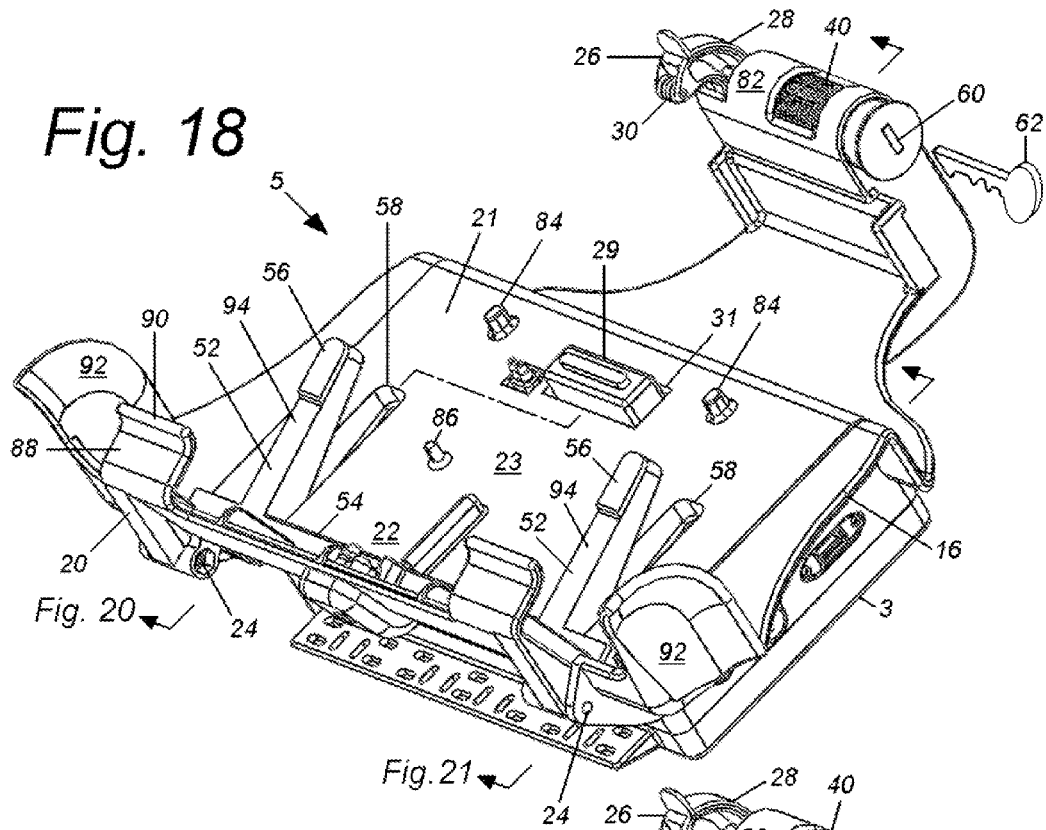

FIG. 18 illustrates docking station 5 with device 1 removed for clarity. Docking station 5 includes expansion module 15 positioned on docking tray 3 and having expansion connector 29 projected through aperture 31 through bearing plate 21 in a position on bearing surface 23 to interface with a mating expansion connector port 27 of device 1 when it is installed in docking station 5. According to one embodiment, expansion connector 29 is structured to be movable or "float" in aperture 31 relative to expansion module 15 and bearing surface 23 of docking tray 3. For example, movable or "floating" expansion connector 29 are of the type disclosed herein and in U.S. patent application Ser. No. 12/806,721 filed Aug. 18, 2010 or U.S. patent application Ser. No. 13/222,997 filed Aug. 31, 2011, which are both incorporated herein by reference.

One or more locating pins 84 may project from bearing surface 23 for initially locating device 1 relative to expansion connector 29 and aid initial coupling with its expansion connector port 27. One or more lock-out switches 86 may be positioned on bearing surface 23 for disabling expansion module 15 before disengagement of computing device 1 from expansion module 15. See, e.g., U.S. Pat. No. 7,298,611 issued Nov. 20, 2007, which is incorporated herein by reference.

According to one embodiment, receiver structure 20 is formed with a tilting receiver cup 88 sized to receive a portion of device 1, and may have a front lead-in lip 90 for guiding device 1 thereinto. Cup 88 pivots into an open position (shown) tilted away from bearing surface 23 to aid in easy insertion and removal of computing device 1. Cup 88 pivots back toward bearing surface 23 into closed position (FIG. 19) for seating computing device 1 against bearing surface 23 with expansion connector port 27 coupled with expansion connector 29. Docking tray 3 may have opposing side lips 92 for helping position device 1 relative to expansion connector 29.

At least one or more movable preload levers 94 are positioned adjacent to bearing surface 23 and are resiliently pivotable relative thereto. For example, each preload lever 94 includes a lever arm 52 extended from a rear portion 54 of tilting cup 88 of receiver structure 20. Therefore, preload levers 94 are pivotable relative to bearing surface 23 in combination with receiver structure 20 by operation of pivot pins 24. Additionally, preload levers 94 optionally each include a compression portion 56 adjacent to a distal end of lever arm 52 and raised above level of lever arm 52 toward front portion of receiver cup 88 opposite from lever arms 52. When present, compression portion 56 is optionally formed of an elastomeric material. Optional recesses 58 are formed in bearing surface 23 sized for receiving thereinto preload levers 94, whereby device 1 is seated against bearing surface 23 without interference from levers 94.

FIG. 18 also illustrates security mechanism 82 being optionally operated by combination lock 40. Alternatively, security mechanism 82 being optionally operated by a key lock 60 activated by a key 60a.

Figure 19:
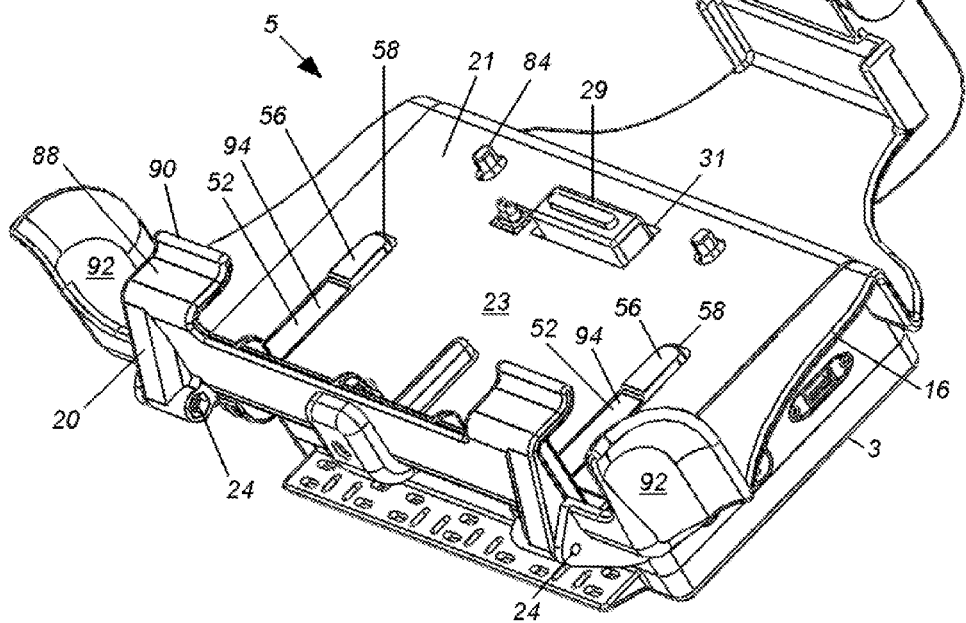

FIG. 19 illustrates docking station 5, wherein computing device 1 is removed for clarity. Here, receiver structure 20 is shown in the closed position with cup 88 tilted toward bearing surface 23 for seating computing device 1 thereagainst with connector port 27 coupled with expansion connector 29. Cup 88 pivots back toward bearing surface 23 into the closed position by pressing device 1 toward bearing surface 23 against resistance of resiliently pivotable preload levers 94. Computing device 1 seats against bearing surface 23 when preload levers 94 are received into recesses 58, whereupon its connector port 27 couples with expansion connector 29 of docking station 5.

Figure 20:
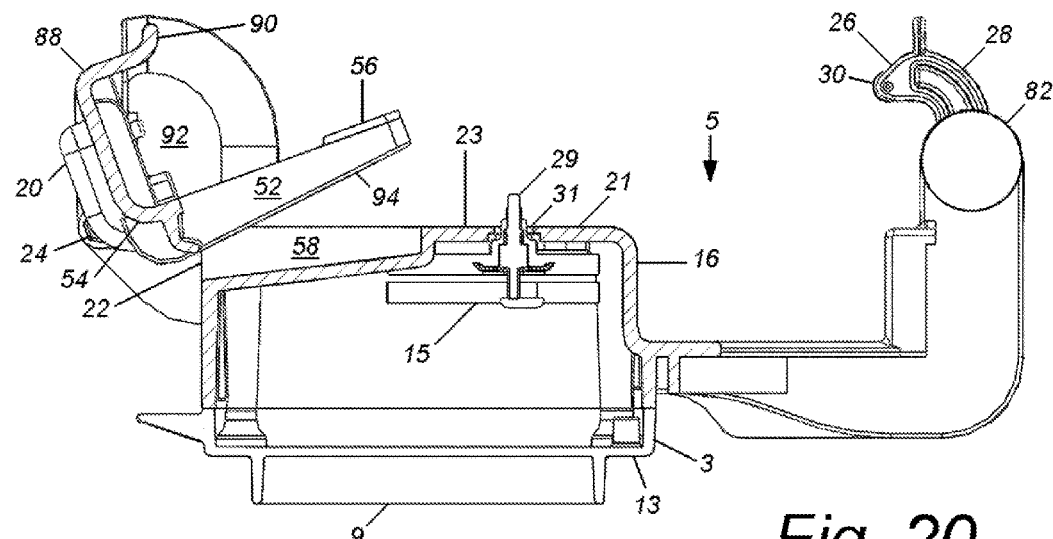

FIG. 20 is a side cross-section view taken through cup 88 portion of receiver structure 20 and expansion module 15. Here, receiver structure 20 is shown in the open position with cup 88 and preload levers 94 tilted away from bearing surface 23 of tray body 16.

Figure 21:
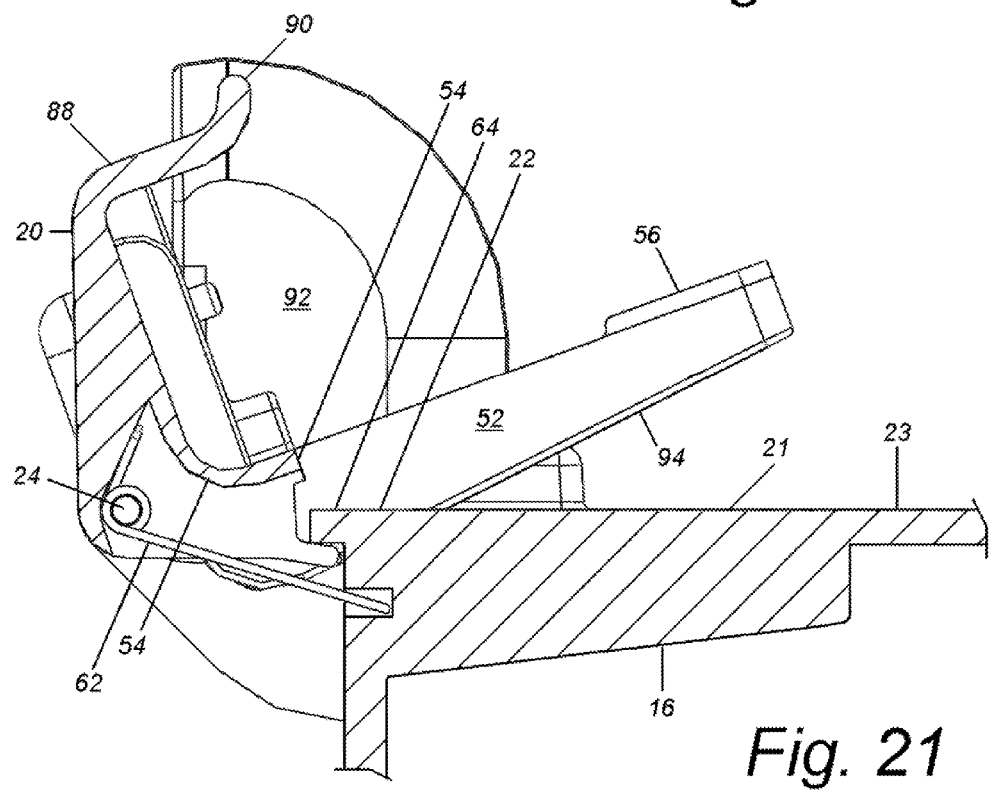

FIG. 21 is a close-up side cross-section view taken through docking tray 3 and receiver structure 20. Receiver structure 20 is shown in the open position with cup 88 and preload levers 94 pivoted about pivot pins 24 in a position tilted away from bearing surface 23 of tray body 16.

An urging means 62 is coupled between receiver structure 20 and docking tray 3 for urging receiver structure 20 to rotate away from docking tray 3, which also urges preload levers 94 outwardly of bearing surface 23. For example, urging means 62 is a hinge spring or other resilient biasing member coupled between a portion of tray body 16 and a portion of receiver structure 20. Urging means 62 is optionally positioned at one or both pivot pins 24. According to one embodiment, travel of receiver structure 20 outwardly away from docking tray 3 is limited. For example, a catch 64 on receiver structure 20 is positioned adjacent to encounter edge 22 of bearing surface 23 for arresting outward travel of receiver structure 20.

FIGS. 22-25 illustrate installation and removal of portable computing device 1. Here, portable computing device 1 is of a particular design. However, portable computing devices of other designs are contemplated and, as will be understood by those of skill in the art, details of docking tray 3 are adjusted as necessary to accommodate such designs without deviating from the scope and intent of the present invention.

Figure 22:
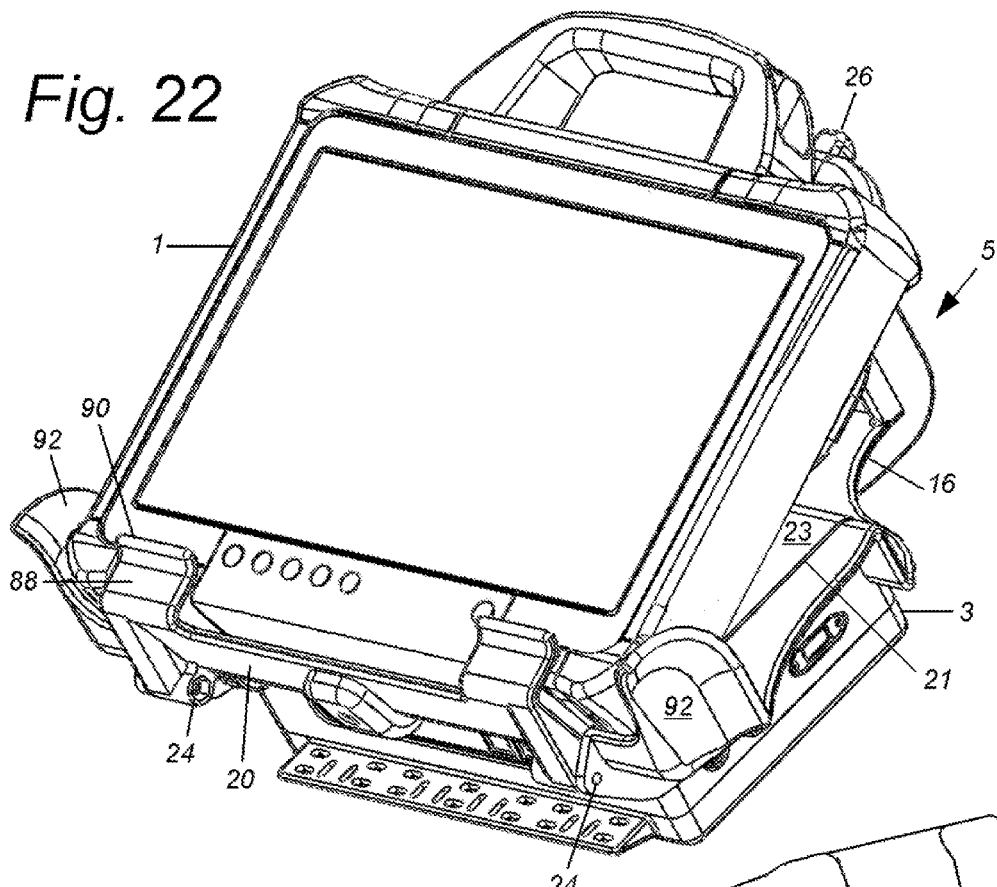

In FIG. 22 when receiver structure 20 is in the open position, one edge of computing device 1 is seated in outwardly tilted cup 88 between front lead-in lip 90 and rear preload levers 94 before being seated against surface 23 of bearing plate 21.

Figure 23:
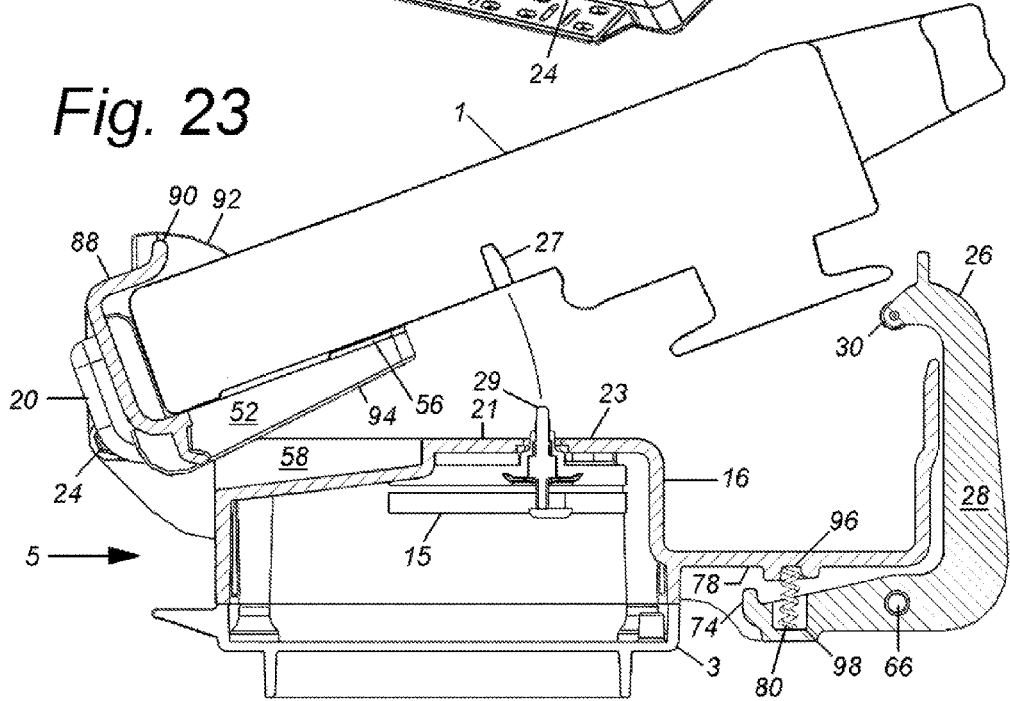

FIG. 23 is a side cross-section view of the configuration shown in FIG. 22, having receiver structure 20 is in the open position with one edge of computing device 1 seated in outwardly tilted cup 88 between front lead-in lip 90 and rear preload levers 94 before being seated against surface 23 of bearing plate 21. Clamping arm 28 of clamping mechanism 26 is pivotable relative to tray body 16 about a pivot 66 away from receiver structure 20 and is adapted for cooperating therewith for securing computing device 1 relative to tray body 16 and bearing surface 23 thereof.

Figure 24:
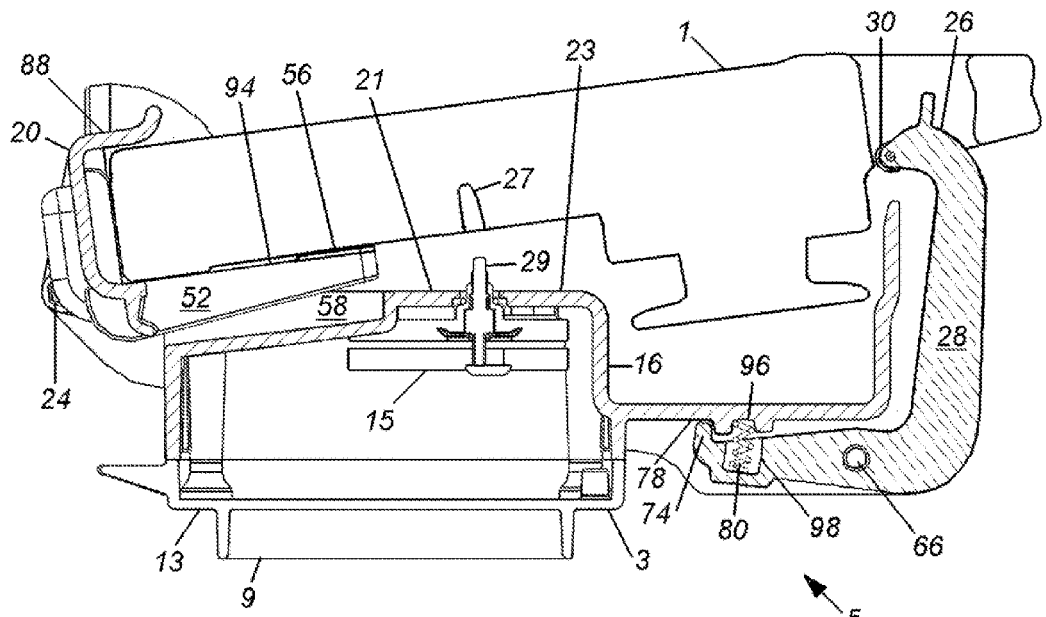

FIG. 24 is a side cross-section view showing computing device 1 partly installed in (or partly removed from) docking station 5 with one edge of device 1 seated in partly outwardly tilted cup 88 of receiver structure 20 before being fully seated against surface 23 of bearing plate 21. Here, receiver structure 20 is between the open position and the closed position. As illustrated, clamping arm 28 of clamping mechanism 26 is pivoted relative to tray body 16 about pivot 66 away from receiver structure 20 until a tail portion 74 encounters a stop portion 78 of tray body 16, which arrests outward travel of clamping mechanism 26. Roller 30 permits easy passage of computing device 1 past clamping arm 28.

A biasing member 80 resiliently urges clamping arm 28 to rotate about pivot 66 for rotating clamping mechanism 26 toward receiver structure 20 into the secure position (FIG. 25) relative to tray body 16. By example and without limitation, biasing member 80 is a coil compression spring between tail portion 74 of clamping arm 28 and tray body 16 for tail portion 74 to rotate away from tray body 16. Optionally, tray body 16 and tail portion 74 have opposing recesses 96 and 98 for retaining biasing member 80 therebetween. Biasing member 80 also operates to urge roller 30 into contact with computing device 1 during insertion (or removal).

Figure 25:
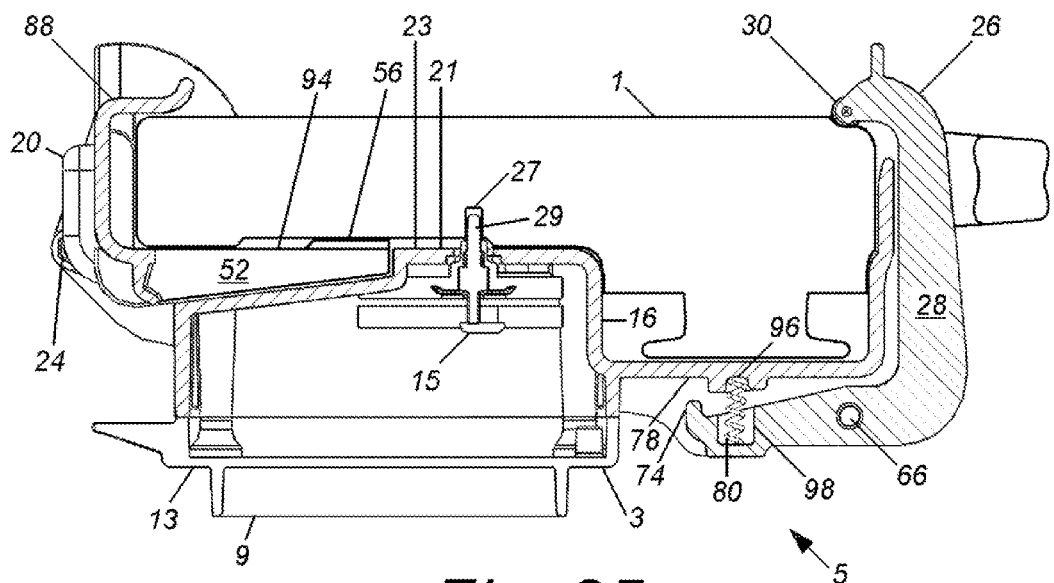

FIG. 25 is a side cross-section view showing computing device 1 fully installed in docking station 5, as illustrated in FIG. 17. Here, receiver structure 20 is in the fully closed position with one edge of computing device 1 seated in inwardly tilted cup 88 between front lead-in lip 90 and rear preload levers 94 and fully seated against surface 23 of bearing plate 21. Expansion connector 29 is coupled with mating connector port 27 of computing device 1.

Thereafter, security mechanism 82 is optionally operated for locking clamping mechanism 26 in either of the secure or unsecured position.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A docking station, comprising:
a docking tray comprising a tray body comprising a bearing surface adapted for receiving thereon a device body;
a device receiver structure positioned adjacent to an edge of the bearing surface of the tray body;
a device clamping mechanism coupled opposite from the receiver structure for cooperating therewith;
a floating expansion connector connectable with the device I/O connector, the expansion connector projected from the bearing surface and being resiliently relative thereto; and
at least one substantially resilient preload mechanism positioned adjacent to bearing surface and at least a portion thereof being projected thereabove.

2. The docking station of claim 1, wherein the preload mechanism further comprises an arm, and an urging means coupled between the arm and the tray body for urging the arm outwardly of the bearing surface.

3. The docking station of claim 2, wherein the arm further comprises a lever arm pivotally coupled to the tray body.

4. The docking station of claim 3, wherein the receiver structure is further pivotable relative to the tray body.

5. The docking station of claim 4, wherein the lever arm further comprises an extension of the receiver structure.

6. The docking station of claim 3, wherein the tray body further comprises a relief formed in the bearing surface and adapted for receiving the lever arm thereinto.

7. The docking station of claim 1, wherein the preload mechanism further comprises means for maintaining compression between a device installed in the device receiver structure and a portion of the device receiver structure opposite from the bearing surface of the tray body.

8. The docking station of claim 1, wherein the clamping mechanism further comprises a clamping arm having a roller positioned adjacent to one end thereof distal of the tray body, the clamping arm being coupled for motion between an unsecured position rotated away from the receiver structure, and a secure position rotated toward the receiver structure.

9. The docking station of claim 8, wherein the clamping mechanism further comprises an urging member coupled between the clamping arm and the tray body for urging the clamping arm inwardly of the bearing surface.

10. The docking station of claim 9, further comprising a security mechanism for locking the clamping mechanism in one of the unsecured and secure positions.

11. A docking station, comprising:
a docking tray comprising a tray body formed with a device bearing plate having an external bearing surface on which a body of a portable device having an expansion connector port is to be placed;
a receiver structure pivotally coupled adjacent to a first edge of the bearing surface, the receiver structure comprising a tilting receiver cup sized to receive therein a portion of the device body, and one or more preload levers positioned adjacent to a rear portion of the receiver cup adjacent to the bearing surface of the tray body;
urging means coupled between the tray body and at least one preload lever for urging the preload lever outwardly of the bearing surface;
a clamping mechanism comprising a portion thereof positioned substantially opposite from the receiver structure for clamping the body of the portable device relative to the bearing surface; and
an expansion module coupled to the device bearing plate and comprising a floating expansion connector projected from the bearing surface thereof and movable relative thereto and further interconnectable with the expansion connector port.

12. The docking station of claim 11, further comprising a relief formed in the bearing surface and adapted for receiving one of the preload levers thereinto.

13. The docking station of claim 11, wherein the clamping mechanism further comprises a clamping arm having a roller positioned adjacent one end thereof distal of the tray body, the clamping arm pivotally coupled to the tray body for motion between an unsecured position having the distal end thereof rotated away from the receiver structure, and a secure position having the distal end thereof rotated toward the receiver structure.

14. The docking station of claim 13, wherein the clamping mechanism further comprises an urging means coupled between the tray body and the clamping arm for urging the clamping arm inwardly of the bearing surface.

15. The docking station of claim 1, wherein the floating expansion connector is further resiliently moveable in three dimensions relative to the bearing surface.

16. A docking station, comprising:
a docking tray comprising an external bearing surface structured for receiving thereon a body of a portable device having an expansion connector port;
a receiver structure receiver structure comprising a receiver cup pivotally coupled adjacent to a first edge of the bearing surface, the receiver cup adapted to receive a portion of the device body, and a preload lever positioned adjacent to a rear portion of the receiver cup adjacent to the bearing surface;
urging means coupled for urging the preload lever outwardly of the bearing surface;
a clamping mechanism positioned substantially opposite from the receiver structure for clamping the body of the portable device relative to the bearing surface; and
an expansion module coupled relative to the bearing surface and comprising a floating expansion connector interconnectable with the expansion connector port, a portion of the floating expansion connector projected from the bearing surface and movable relative thereto.

17. The docking station of claim 16, wherein the preload lever further comprises a lever arm comprising a compression portion adjacent to an end thereof distal from the receiver cup.

18. The docking station of claim 16, wherein the preload lever further comprises a lever arm; and
the bearing surface further comprises a recess formed therein sized for receiving a least a portion of the lever arm thereinto.

19. The docking station of claim 16, wherein the clamping mechanism 15 further comprises an urging means coupled between the tray body and the clamping arm for urging the clamping arm inwardly of the bearing surface.

20. The docking station of claim 19, further comprising means for locking the clamping mechanism in one of a secured position and an unsecured position.

21. The docking station of claim 1, wherein the floating expansion connector is further resiliently moveable in two or more dimensions relative to the bearing surface.

* * * * *